United States Patent [19]

Juengel

[11] Patent Number: 4,693,110

[45] Date of Patent: Sep. 15, 1987

[54] METHOD AND APPARATUS FOR TESTING THE OPERABILITY OF A PROBE

[75] Inventor: Richard O. Juengel, Romeo, Mich.

[73] Assignee: GTE Valeron Corporation, Troy, Mich.

[21] Appl. No.: 741,869

[22] Filed: Jun. 6, 1985

[51] Int. Cl.⁴ .................... G01D 18/00; G01M 19/00; G01B 11/00

[52] U.S. Cl. ..................... 73/1 R; 364/474; 33/555; 33/558; 340/514; 340/636; 340/680

[58] Field of Search ............ 73/1 R, 1 D, 1 J, 865.9; 33/555-559, 561, DIG. 3, 169 R, 502; 340/680, 636, 514, 825.16, 825.23, 825.76; 324/426, 433; 364/474.37

[56] References Cited

U.S. PATENT DOCUMENTS

| | | |
|---|---|---|
| 3,539,912 | 11/1970 | Wardle .................... 73/1 R X |
| 4,153,998 | 5/1979 | McMurtry .................. 33/556 |
| 4,163,938 | 8/1979 | Moore ..................... 73/1 R X |
| 4,276,698 | 7/1981 | Dore et al. ................ 33/169 R X |
| 4,339,714 | 7/1982 | Ellis ...................... 33/559 X |
| 4,380,873 | 4/1983 | Ayres et al. ............... 33/556 |
| 4,401,945 | 8/1983 | Juengel .................... 33/556 X |
| 4,437,240 | 3/1984 | Juengel et al. ............. 33/558 X |
| 4,447,958 | 5/1984 | Tanaka .................... 33/561 |
| 4,509,266 | 4/1985 | Cusack ..................... 33/DIG. 3 X |
| 4,521,769 | 6/1985 | Dudeck et al. .............. 73/1 R X |
| 4,548,066 | 10/1985 | Martinez et al. ............ 73/1 J |

FOREIGN PATENT DOCUMENTS

| | | | |
|---|---|---|---|
| 2063693 | 6/1972 | Fed. Rep. of Germany ....... 73/1 R |
| 89460 | 7/1981 | Japan ...................... 33/169 R |
| 111408 | 7/1982 | Japan ...................... 73/1 R |
| 183362 | 10/1984 | Japan ...................... 73/1 R |
| 15515 | 1/1985 | Japan ...................... 73/1 R |
| 937381 | 9/1963 | United Kingdom ............. 33/169 R |

Primary Examiner—Tom Noland
Attorney, Agent, or Firm—Harness, Dickey & Pierce

[57] ABSTRACT

The present invention is directed to an apparatus and method of testing the operability of probes used in performing workpiece probing operations. According to the preferred embodiment of the present invention, the probe has a first circuit for generating a first signal, the first signal inducing the probe to generate a second signal. A second circuit is provided for receiving the second signal. The second circuit is adapted to generate a third signal indicative of the operability of the probe when the second signal is received. In the preferred embodiment, an infrared signal is delivered by the apparatus to the probe causing the probe to emit an infrared signal. The infrared signal emitted by the probe is then used by the apparatus to generate an electrical signal indicative of the operability of the probe.

21 Claims, 7 Drawing Figures

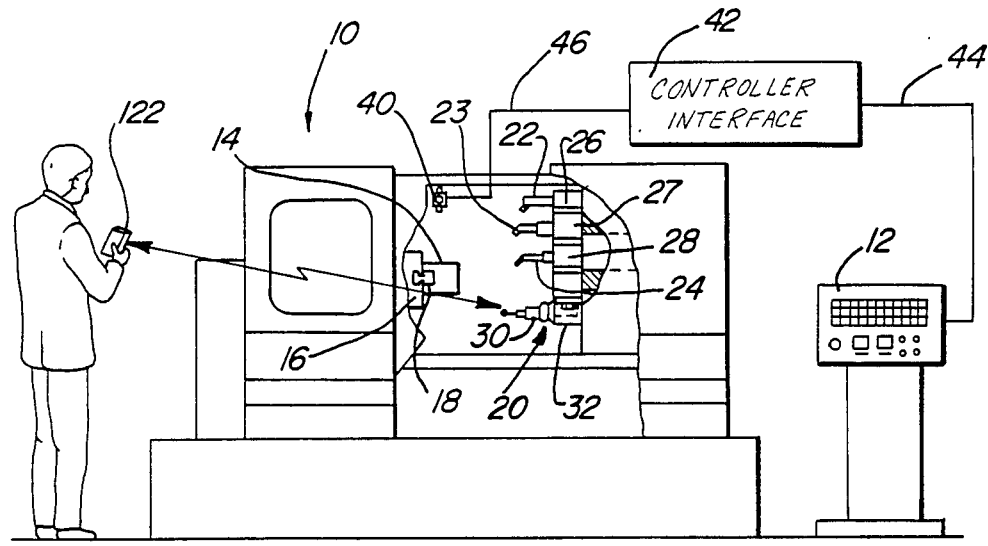
_Fig-1_
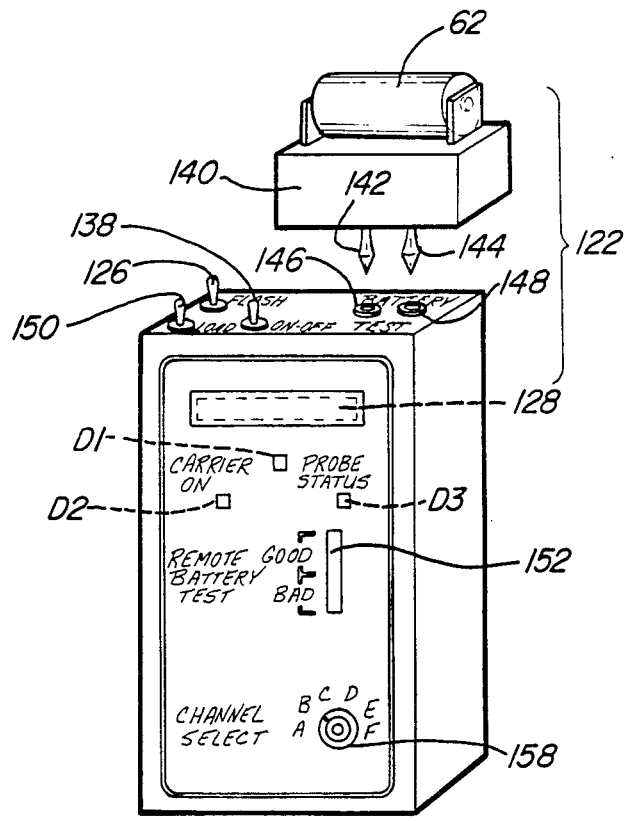
_Fig-4_

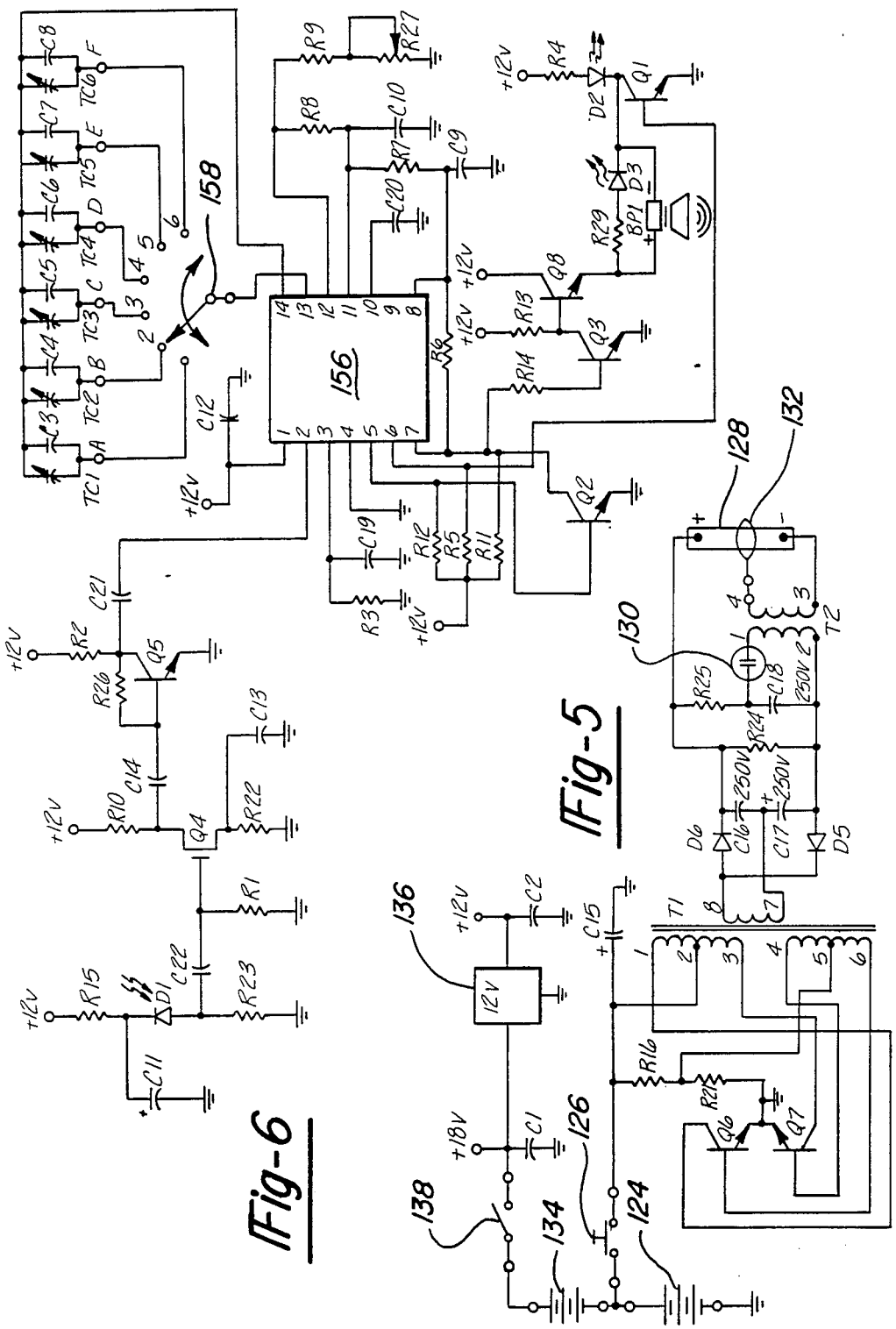

METHOD AND APPARATUS FOR TESTING THE OPERABILITY OF A PROBE

DESCRIPTION

1. Technical Field

This invention generally relates to workpiece inspection systems and, more particulry, to the use of an apparatus for testing probes in automated machine tools used for contacting the workpiece and providing information relating thereto.

2. Background

Automatic machine tool systems require a precise means of locating surfaces on workpieces. One of the most common methods is to have the machine move a probe into contact with the workpiece and record the probe position when contact is made. Probes used in such methods generally include a stylus for contacting the workpiece and circuitry which operates to generate an electrical signal when the stylus contacts the part. The machine controller can then calculate information about the shape or location of the part from the X Y and Z axes positional data of the probe when the stylus contact generates the electrical signal.

One such apparatus and probe assembly is disclosed in U.S. Pat. No. 4,509,266 entitled "Touch Probe" which is assigned to the present assignee. Disclosed in this application is a machine controller which initiates on optical signal from a head mounted at a convenient location on the machine. As a result, the probe transmission circuitry is enabled and generates an infrared ("IR") signal to a given characteristic to indicate that the probe is operating properly and ready for use. The controller then proceeds with the inspection operation. When the probe stylus contacts a work piece, the characteristic of the IR transmission changes. This change is remotely detected and used by the controller to derive useful information about the workpiece. The probe has a self-contained source of electrical potential, and has a timer which shuts off power to the circuit components after a predetermined time has elapsed from the initial power up cycle or stylus contact.

One of the problems encountered with the use of this type of probe has been the inability to determine the operability of the probe in an easy and convenient manner. For example, it has been difficult to determine whether the circuits designed for receiving and transmitting the IR signals are properly functioning and the extent to which the batteries in the probe have been discharged. The common testing procedure which has been used in the past involves actuating the machine controller, which may be very time consuming if a large number of probes are to be tested. Further, it has not been possible to estimate the remaining lifetime of the probe's battery, which inherently varies from probe to probe depending on the amount of time the probe has been used. These problems have created losses in production time which could otherwise be used in manufacturing operations.

The present invention is directed to an apparatus and method of testing the operabilty of probes used in performing workpiece probing operations. According to the preferred embodiment of the present invention, a testing unit has a first circuit means for generating a first signal, the first signal inducing the probe to generate a second signal. A second circuit means is provided for receiving the second signal. The second circuit means is adpated to generate a third signal indicative of the operability of the probe when the second signal is received.

In the preferred embodiment of the present invention the apparatus takes the form of a small, lightweight housing that can be easily carried into the general proximity of the machine tool in which the probe is mounted and first circuit means therein is adpated to generate an infrared optical signal. The probe is adapted to respond to this signal by itself generating an infrared signal having a given characteristic. The third signal is adapted to energize a visual indicating device on the housing of the test unit to provide the user with an indication that the probe is capable of proper operation.

Advantageously, the probe may generate a "carrier on" signal which is indicative of the operability of the probe when the probe is not in contact with an actual or simulated workpiece. Further, the probe may generate a "probe status" signal which corresponds to the physical contact of the probe stylus with an actual or simulated workpiece. In a further embodiment of the present invention, the testing unit is able to decode both the "carrier on" and "probe status" signals and generate visual indication of the existence of the signals.

In yet a further embodiment of the present invention, a first circuit means is provided for inducing the probe to generate a second signal when the probe is in proper operating condition. Second circuit means is also provided for receiving the second signal from the probe, and is adapted to generate a third signal indicative of the operability of the probe when the second signal is received. Third circuit means is also provided for determining the operability of the battery of the probe.

BRIEF DESCRIPTION OF THE DRAWINGS

These and various other advantages of the present invention will become apparent to one skilled in the art upon reading the following specification and by reference to the drawings in which:

FIG. 1 is an environmental view showing a machine tool system having a probe, the operability of which is to be tested by the present invention;

FIG. 4 is a perspective view of the testing unit of one embodiment of this invention;

FIG. 5 is a schematic diagram of circuitry used in the present invention to generate an optical signal to turn on the probe and supply electrical potential to the testing unit;

FIG. 6 is a schematic diagram of circuitry used in this invention to detect the existence of "carrier on" and "probe status" signals.

DESCRIPTION OF THE PREFERRED EMBODIMENT

Figure 2:
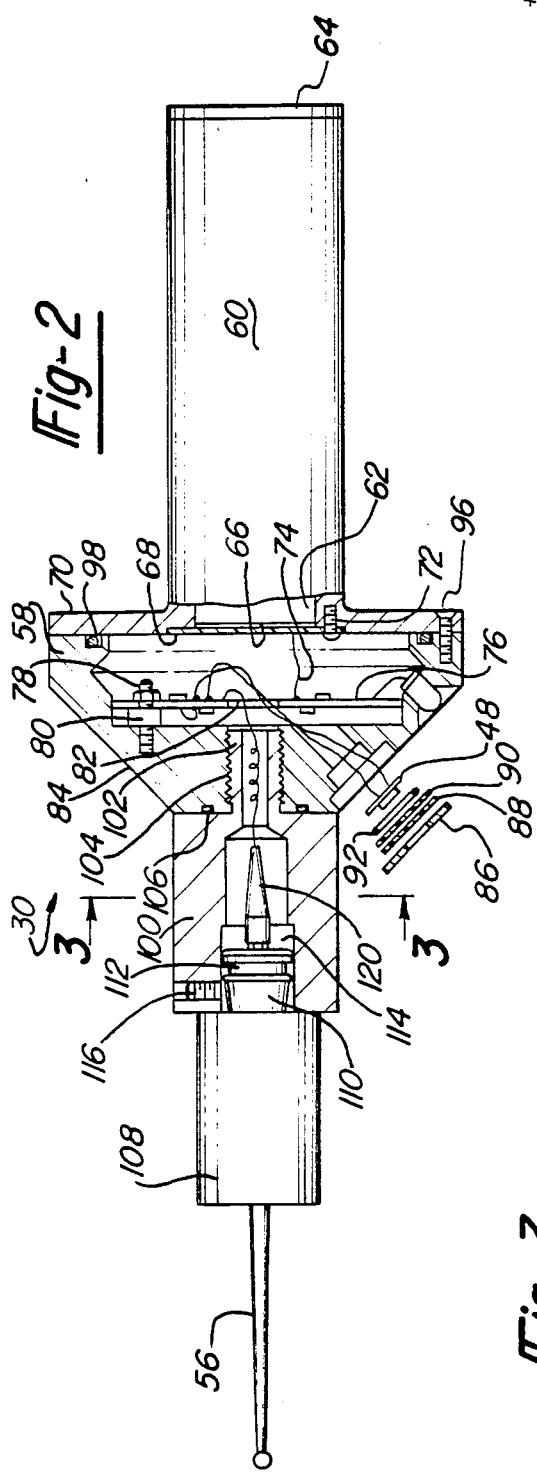
FIG. 2 illustrates the cross-sectional view of a probe construction using an optical turn on technique for initiating a probing operation.

FIG. 1 illustrates, in simplified form, a typical machine tool system which may be used in connection with the present invention. A numerically controlled turning center 10 is shown therein together with a controller 12 for automatically controlling turning operations on a workpiece 14 according to programmed instructions. Turning center 10 typically includes a rotating chuck 16 with jaws 18 thereon for holding workpiece 14. Mounted to a turret 20 are a plurality of tools 22–24 for performing work on the inner diameter (ID) of workpiece 14. Typically, ID tools of this sort include an elongated shank portion which are held in place in turret 20 by way of adapters 26–28. In addition, a workpiece inspection probe 30 is mounted to turret 20 by adapter 32, which is identical to adapters 26–28 which are used to mount tools 22–24.

As is known in the art, controller 12, among other things, operates to rotate turret 20 to bring the desired tool into the appropriate work position and then moves turret 20 until the tool contacts the workpiece and performs its desired machining operation thereon. Probe 30, on the other hand, is used to inspect the workpiece 14. In this specific example, probe 30 is known in the industry as a touch probe in that it generates an output signal when the probe stylus touches a surface of the workpiece or other object. Suitable resolvers, digitizers or the like are used to provided signals to controller 12 indicating the position of the probe 30. Consequently, when the signal from probe 30 indicates contact with the workpiece, controller 12 can derive useful information about workpiece dimensions, appropriate positioning thereof within the chuck, etc.

One aspect of this type of machine tool system is the two-way optical communication between probe 30 and a flash/receiver head 40. Head 40 is connected to controller 12 through an interface 42. When controller 12 determines that it is time to use probe 30 for a probing operation, it generates a signal over line 44 to interface 42, which in turn generates a control signal on line 46 to cause head 40 to transmit a given optical signal to probe 30. This optical signal which may be a high intensity flash of infrared radiation, is sensed by a suitable detector 48 in probe 30. The flash causes detector 48 to couple the probe's self-contained battery power source to the probe's transmission circuitry. Preferably, probe 30 responds to the flash by transmitting IR radiation at a given frequency back to head 40 via light emitting diodes (LEDs) 50–54. This IR radiation is received by head 40 which, in turn, supplies a signal to controller 12 via interface 42 indicating that the probe 30 is operating properly and ready to perform its inspection operation.

Controller 12 then causes turret 20 to advance probe 30 until the stylus 56 contacts workpiece 14. Probe 30 responds to stylus contact by using LEDs 50–54 to transmit an optical signal of a different characteristic, e.g. by shifting in the frequency of the IR radiation. The shift in frequency, generally known as frequency shift keying ("FSK"), is detected by interface 42 and communicated to controller 12. The workpiece inspection operation continues as desired, with probe 30 transmitting frequency shifted IR radiation to head 40 every time the stylus makes contact.

Probe 30 includes timing means which disconnects the battery supply from the transmission circuitry after a predetermined period of time. This time period begins when battery power is initially applied to the circuitry and is reset every time the stylus contacts the workpiece. Thus, after the probing operation is coupled, the time period will eventually lapse and the battery power will be disconnected from the transmission circuitry. Accordingly, the battery power is only used during periods of anticipated probe usage. Whenever the probe is not in use, the battery power is disconnected conserving energy and prolonging periods between battery replacement.

Figure 3:
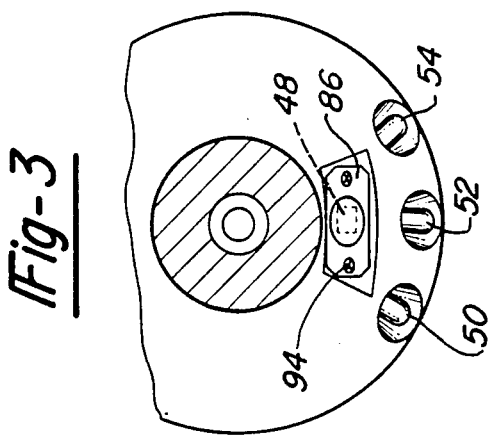
FIG. 3 is a cross-sectonal view along lines 3—3 of the probe shown in FIG. 2.

FIGS. 2 and 3 illustrate in more detail the construction of probe 30. The probe housing is characterized by a generally cone-shaped middle portion 58 and a rearwardly projecting shank or cylindrical portion 60 of reduced cross-sectional diameter. In this specific embodiment, cylindrical portion 60 is hollow measuring about 4 and ¼ inches in length, with an outer diameter of about 1.4 inches.

The outer dimensions of cylindrical portion 60 are chosen to generally correspond with the dimensions of the bodies or shanks of tools 22–24. Consequently, probe 30 may be used in place of one of the tools in turret 20 and held in adapter 32 in the same manner. This placement of probe 30 insures that the tip of stylus 56 is spaced at a known position with respect to turret 20. Controller 12 may then accurately rely upon the position of the stylus 56 during the probe inspection operation. Of course, other conventional means may be used to position stylus tip 56 at the appropriate spacing. For example, some machine tool systems utilize a set screw (not shown) or other means within the rear of pocket of adapter 32 to adjust the stylus spacing.

Cylindrical portion 60 advantageously serves the dual purpose of providing a battery compartment as well as to provide an easy to use mounting member. The elongated cylindrical shape of portion 60 enables the use of long life "cylindrical" batteries resembling typical flashlight batteries in shape for powering the probe transmission circuitry. Preferably, each battery 62 is a "C" cell lithium type. The ability to use cylindrical batteries, instead of smaller batteries such as button or disc cells, provides the probe with an exceedingly long operational life at low cost.

Each battery 62 is slid into the interior of portion 60. A spring loaded cap 64 is then threaded onto the end of portion 60, causing the positive or male terminal 66 to engage board 68. The lower surface of board 68 includes a circular conducting layer (not shown) which electrically controls battery 62. Board 68 is secured to an interior surface of wall 70 by way of screws 72. An insulated lead 74 makes electrical connection with conductive layer of board 68 by way of a plated through hole in board 68. The opposite end of lead 74 is connected to circuit board 76 containing the probe circuitry. A description of the probe circuitry is described in the aforementioned U.S. Pat. No. 4,509,266 which is hereby incorporated by reference. Circuit board 76 is generally circular in shape containing electrical components mounted on both sides thereof. Circuit board 76 is mounted within the interior or middle portion 58 by way of suitable fasteners 78 passing through standoffs 80. Board 76 also includes a centrally located aperture 82 through which various leads can pass to facilitate connection to the appropriate areas of circuit board 76.

Photodetector 48 and its associated subassembly is mounted on the outer sloping surface 84 of middle housing portion 58. Photodetector 48, in this particular example, is a PI diode such as part No. DP104 available from Telefunken. Photodetector 48 fits within a countersunk bore and is held in place by way of a bezel 86 having a window therein. Interposed between bezel 86 and photodetector 48 are layers of transparent plastic 88, an infrared filter layer 90 and an O-ring 92. Suitable fasteners 94 sandwich all of these components into a subassembly mounted within the countersunk bore. The leads from photodetector 48 pass through aperture 84 and are connected to suitable points on circuit board 76.

LEDs 50-54 are mounted adjacent to photodetector 48. LEDs 50-54 are designed to emit optical signals in the infrared radiation band which is not normally visible to the human eye. LEDs 50-54 may comprise, for example, component Nos. OP290 available from TRW, Inc. It should be noted at this point that the arrangement of LEDs 50-54 and photodetector 48, taken together with the configuration of the sloping probe surface to which they are mounted combine to optimize several important advantages. For example, by mounting LEDs 50-54 onto the sloping surface 84 of the probe, the infrared radiation that is emitted thereby is directed forwardly of turret 20 at angles at which the radiation may be easily picked up by various locations of head 40. The probe construction enables the user to rotate the probe into a position where the LEDs 50-54 and photodetector 48 are pointing in the general direction of head 40. Thus, it is not necessary to mount head 40 at any absolute spatial location relative to probe 30 giving the system great flexibility for use in different machine tool systems. Reliable optical communication between probe 30 and head 40 is thereby obtained while at the same time minimizing the number of light emitting devices within the probe 30. By keeping the number of light emitting devices to a minimum the energy drain from the batteries is kept as small as possible, thereby further prolonging battery life.

Rounding out the assembly of middle portion 58, wall 70 is affixed to rearward portions of portion 58 by way of suitable fasteners 96. O-rings, such as ring 98, are advantageously used to seal the interior of the probe 30 from the somwhat adverse conditions that the probe may encounter during use in the machine tool system.

An annular nosepiece 100 includes a threaded male member 102 which mates with threads formed in a bore 104 in the front face of middle housing portion 58. O-ring 106 is again employed for sealing purposes. Nosepiece 100 may be made in various lengths to increase or decrease the relative spacing of stylus tip 56 as may be desired. Due to the threaded fastening engagement with the middle housing portion 58, a variety of such nosepieces can be made and interchanged with one another for use in different applications.

A switch unit 108 is removably attached to nosepiece 100. Switch unit 108 includes a circular whistle notch end construction 110 including a surrounding O-ring 112 which is press fit into the internal passageway 114 within nosepiece 100. One or more set screws 116 extending orthogonally through nosepiece 100 clamps the switch unit 108 in place. Switch unit 108 can be a variety of constructions that operate to open or break one or more electrical contacts therein when stylus 56 is moved from its rest position. Those skilled in the art are aware of a variety of constructions that fulfill this general purpose. One suitable switch construction is disclosed in detail in U.S. Pat. No. 4,451,987 which is also assigned to the assignee of the present invention. This patent is hereby incorporated by reference. Briefly, this construction employs a wobble plate with three equally spaced ball contacts thereon. The wobble plate is spring biased so that the balls are normally pressed against three corresponding electrically conductive inserts. The three ball-insert pairs serve as switches and are connected together in series. The wobble plate is connected to stylus 56. Whenever stylus 56 moves, the wobble plate tilts and lifts one of the ball contacts from its corresponding insert thereby breaking the electrical connection therebetween.

The three switches in unit 108 are connected to circuitry on board 76 by way of cable 118. The other end of cable 118 includes a miniature coax connector 120 or other suitable connector that mates with a connector on the end of replaceable switch unit 108. Those skilled in the art appreciate that these types of switch units are very sensitive and may need to be replaced. The construction of the present invention enables such replacement to be made quickly and easily.

Various shapes and sizes of styli may be used in connection with probe 30. For example, instead of the straight stylus 56 shown in the drawings, a stylus may be used in which the tip thereof is offset from the major longitudinal axis of probe 30. The various styli are interchangeable with switch unit 108 and may be attached thereto by the use of suitable fastening means such as set screws.

Figure 7:
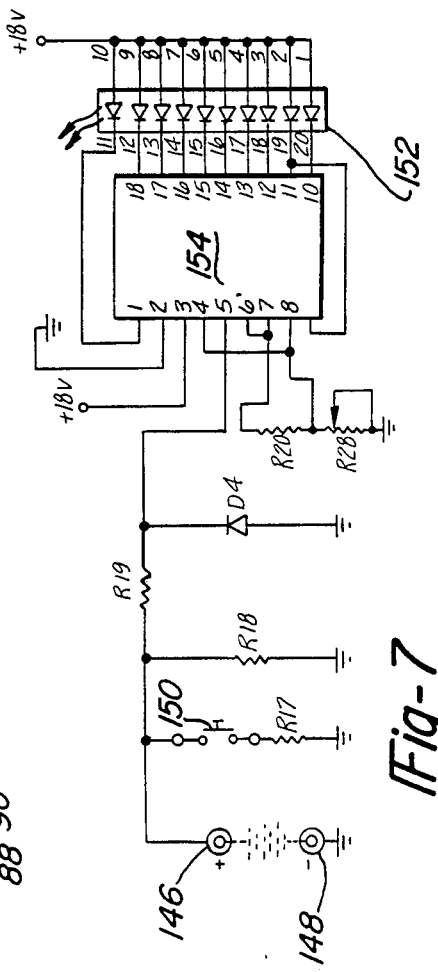
FIG. 7 is a schematic diagram of the circuitry used to detect the operability of the batteries contained in the probe.

To test the operability of probe 30, a hand-held testing unit 122 is provided as shown in FIGS. 1 and 4, with the associated circuitry shown in FIGS. 5, 6 and 7. To generate a test signal, testing unit 122 includes a flash tube circuit having a battery 124 (FIG. 5) which may be of a 9-volt alkaline type. To initiate testing of the probe, terminal 2 of a transformer T1 is connected to battery 124 through a manually actuated switch 126, and terminals 1 and 3 of transformer T1 are each connected to the collectors of a pair of NPN transistors Q6 and Q7, respectively. Transistors Q6 and Q7 form an oscillating circuit, the operation of which will be described subsequently. Terminal 2 of transformer T1 is further connected to ground through bypass capacitor C15, and terminals 4 and 6 of transformer T1 are each connected to the bases of transistor Q7 and Q6, respectively. Terminal 5 of transformer T1 is connected to switch 126 through resistor R16, and to ground through a resistor R21. In addition, the emitters of transistors Q6 and Q7 are also connected to ground.

To induce current in the secondary winding of transformer T1, causing testing unit 122 to generate a flash, switch 126 is closed causing current from battery 124 to flow through resistor R16 to the bases of transistors Q6 and Q7 through terminals 4, 5, and 6 of transformer T1. Both the current delivered to the bases of transistors Q6 and Q7, as well as the voltage potential on the collectors of transistors Q6 and Q7, increase as the charge on capacitor C15 increases. Eventually, the base junctions of transistors Q6 and Q7 become sufficiently biased to enable transistors Q6 and Q7 to conduct current from battery 124 through windings 2-1 and 2-3 to ground, inducing a forward current in the secondary winding of transformer T1. As transistors Q6 and Q7 begin to conduct, a substained oscilation is maintained by the alternate conduction of Q6 and Q7, caused by the feedback winding 1-3 of T1 delivering current pulses to the bases of Q6 and Q7 which are 180° out of phase with one another. It will therefore be seen that the current flowing through windings 5-4 and 5-6 repeatedly increase and decrease, thus enabling the primary windings to induce a forward and reverse current in the secondary winding of the transformer T1.

To drive a flash tube 128 when switch 126 is actuated, the secondary winding of the transformer T1 is connected to the positive and negative electrodes of flash tube 128. The flash tube 128 is used to generate a high intensity light pulse of short time duration to initiate probe operation. Flash tube 128 preferably uses xenon gas, such as Mouser Electronics Part No. 36FT050, as a xenon flash tube generates light that is rich in infrared radiation. Flash tube 128 is capable of generation a flash or light pulse lasting about 50 microseconds with an approximate intensity of 1.5 watt/seconds. Other types of suitable light sources, of course, can be employed. To provide the voltage across the electrodes of flash tube 128 that is required to generate a flash, a diode D6 connects terminal 8 of the secondary winding to the positive terminal of flash tube 128. Diode D6 is poled to connect current from terminal 8 to the positive electrode of flash tube 128. In addition, a diode D5 connects the negative electrode of flash tube 128 to terminal 8 of the secondary winding of transformer T1 and is arranged to permit current to flow thereto. Diodes D5 and D6, in conjunction with capacitors C16 and C17, form a voltage doubler circuit which operates in the following manner. When current in the primary winding of transformer T1 induces a forward current in the secondary winding (i.e., flowing from terminal 7 to terminal 8), the current passes through diode D6 and capacitor C16 causing capacitor C16 to charge. When current in the primary winding induces a reverse current in the secondary winding (i.e. from terminal 8 to terminal 7), the current flows through diode D5 and capacitor C17 causing capacitor C17 to charge. Since the positively charged plate of capacitor C16 is connected to the negatively charged plate of capacitor C17, The voltage supplied to the electrodes of flash tube 128 is the sum of the potential across capacitors C16 and C17. In one particular example of the present invention, the potential across capacitors C16 and C17 store is approximately 250-300 volts when fully charged. Resistor R24, which is connected in parallel with capacitors C16 and C17, is used as a bleeder resistor to cause a relatively slow discharge of capacitors C16 and C17.

To develop a trigger signal for triggering flash tube 128, resistor R25 and capacitor C18 are connected in series across the electrodes of flash tube 128. A first lead of a trigger tube 130 is connected to the function of resistor R25 and capacitor C18, and the second lead of trigger tube 130 is connected to terminal 1 of the primary winding of a transformer T2. Terminal 2 of the primary winding of transformer T2, as well as terminal 3 of the secondary winding, are connected to the negative electrode of flash tube 128. In addition, terminal 4 of the secondary winding of transformer T2 is connected to a trigger electrode 132 of flash tube 128. When the build up of charge on capacitor C18 reaches the threshold potential of trigger tube 130 allowing current to be conducted through trigger tube 130, capacitor C18 discharges through the primary winding of transformer T2. The secondary winding of transformer T2 steps up the voltage delivered from the primary windings and places a potential of approximately 4,000 volts on trigger electrode 132. Trigger electrode 132 is capacitively coupled to flash tube 128, and the potential developed thereon by transformer T2 is large enough to ionize the gas within the tube 128. The ionized gas is sufficiently conductive to permit the energy from capacitors C16 and C17 to discharge across the electrodes of flash tube 128 to create a very high intensity flash of short duration. After tube 128 flashes, discharging capacitors C16 and C17, capacitor C16 and C17 remain idle until switch 126 is reactivated.

To provide an 18 v and 12 v sources of electrical potential, the positive terminal of battery 124 is further connected to the negative terminal of battery 134 which is also a preferably a 9-volt alkaline type. The positive terminal of battery 134 therefore provides an 18 v source of electrical potential, which is distributed through an 18 v bus (not shown). Further, the positive terminal of battery 134 is connected to a 12 v regulator 136, which in turn is connected to a 12 v bus (not shown). A manually actuated ON/OFF switch 138 is provided which allows selective coupling of the positive terminal of battery 134 to both the 18v and 12v buses, and bypass capacitors C1 and C2 provide for capacitive discharge of the circuit when the switch 138 is opened from a previously closed position.

To provide testing for the batteries within the probe, testing unit 122 further includes a battery test circuit as shown in FIG. 7. The battery 62 of probe 30 to be tested is removed from probe 30 and is inserted into a battery receptacle 140 which has two male connectors 142 and 144 extending therefrom. Also enclosed within the battery receptacle are scaling resistors (not shown) which allow several different types (voltages) of batteries to be tested. Male connectors 142 and 144 are electrically connected to the positive and negative terminals of battery 62, and are adapted to mate with two female connectors 146 and 148 located on testing unit 122. When male connectors 142 and 144 are inserted into female connectors 146 and 148 of testing unit 122, the positive terminal of battery 62 is connected to one terminal of a manually actuated switch 150 and the negative terminal of battery 62 is connected to ground. When switch 150 is closed, the positive terminal of battery 62 is connected to ground through resistor R17, which provides a load across which a potential signal indicative of the operability of battery 62 may be measured. Resistors R18 and R19 are used to lower the current and voltage of this signal as is required for further processing subsequently described. A diode D4 is provided to protect the circuit in the event that female connectors 146 and 148 of testing unit 122 are inadvertently connected to the wrong male connectors 142 and 144 of receptacle 140.

To visually indicate the operability of battery 62, a display 152 and a display driver 154 are provided. Terminals 1-10 of display 152 are connected to the 18 v bus, and terminals 11-20 of display 152 are connected to terminals 1, 18-10 of display driver 154 respectively. Further, terminal 3 of the display driver 154 is connected to the 18v bus, while terminal 2 is connected to ground. Resistors R20 and R28 are adjusted to provide a 3.86 volts potential on the divider resistor high pin 6 and reference output pin 7 of display driver 154, and 2.60 volts on divider resistance low pin 4 and reference adjust pin 8. By wiring pins 4, 6, 7 and 8 as described above, the internal resistive ladder network of display driver 154 is so configured as to sequentially illuminate display 152 in increments of 0.385 volts, thereby indicating the potential across the terminals of battery 62. By measuring the potential across the terminals of battery 62, the operability of battery 62 as well as its remaining useful lifetime may be determined. To ensure the compatibility with display 152, the mode pin 9 of display driver 154 is connected to LED pin 11 of driver 154.

To receive the "carrier on" and "probe status" signals generated by probe 30, testing unit 122 further includes the circuitry shown in FIG. 6. To convert the IR signals generated by probe 30 to electrical signals, a photodetecting diode D1 is used to receive optical signals from LEDs 50-54 of probe 30. Photodetector D1 is also electrically coupled to the 12 v bus through resistor R15, and to ground through bypass capacitor C11. Electrical signals from photodetector D1 indicative of the "carrier on" and "probe status" conditions are then filtered by a filter comprising resistors R23, R1 and capacitor C22. After filtering, the signals enter into an amplifying circuit comprising the transistors Q4 and Q5, the resistors R2, R10, R22 and R26, and the capacitors C13 and C14.

To decode the amplified signal from transistor Q5, a phase-locked loop ("PLL") circuit 156 is connected to the collector of transistor Q5 through coupling capacitor C21. Vcc pin 1 of PLL 156 is connected to the 12 v bus and to bypass capacitor C12. The lock detection filter pin 3 is connected to ground through a parallel combination of resistor R3 and capacitor C19, which are used to eliminate the chatter at the lock detect outputs. In addition, PLL 156 is grounded by wiring pin 4 to ground. The lock detect output pin 5 is at a logical "high" state when PLL 156 is out of lock (i.e., when a "carrier on" signal is absent or is outside of a predetermined detection band), and goes to a logical "low" or conducting state when PLL 156 is locked (i.e., when a "carrier on" signal is detected). The output at the lock detection complement pin 6 is the logical complement of the signal at the lock detection output pin 5. The FSK data output pin 7 is an open collector logic stage and provides a logical "low" signal when the FSK "high" signal (indicative of a probe status condition) is received by PLL 156. The pins 5, 6 and 7 are each connected to the 12 v bus through pull-up resistors R12, R5, and R11 respectively. The use of the outputs at pins 5, 6 and 7 of PLL 156 in detecting the occurence of "carrier on" and "probe status" conditions is more fully described later in this specification.

To test the operability of a variety of probes which transmit IR signals at different frequencies or channels, a plurality of capacitors C3–C8 of different values are provided which may be selectively connected to across capacitor pins 13 and 14 of PLL 156 through a rotary switch 158. Because the value of the capacitance across pins 13 and 14, together with the value of resistor R9, establish the center frequency of the internal voltage controlled oscillator of PLL 156, testing unit 122 may determine the operability of probes transmitting IR signals at a variety of frequencies. The center frequency of the internal voltage controlled oscillator of PLL 156 may be determined as follows:

$$fo = 1/RoCo \ H_z$$

where fo is the desired center frequency of the voltage controlled oscillator, Ro is the sum of the resistances of resistors R9 and R27, and Co is the selected value of the capacitance across pins 13 and 14 of PLL 156. The center frequency can be further fine tuned by adjustment of variable capacitors TC1–TC6 which are connected in parallel with capacitors C3–C8 respectively. Resistor R8 is used to adjust the detection bandwidth of PLL 156, and capacitor C10 sets the loop filter time constant as well as the loop damping factor. Resistor R7 and capacitor C9 are used to form a one-pole post-detection filter for the FSK data output signal from pin 7. Resistor R6, which electrically connects FSK comparator input pin 8 to FSK data output pin 7, introduces a positive feedback across the FSK comparator of PLL 156 to facilitate rapid transition between the output logic states. Finally, the reference voltage pin 10 is bypassed to ground through capacitor C20 which is required for proper operation of PLL 156.

To allow detection of a "carrier on" signal from the LEDs 50–54 of probe 30, the lock detect complement pin 6 of PLL 156 is connected to the base of transistor Q1. The collector of Q1 is connected to the 12 v bus by resistor R4 and light emitting diode D2. When a "carrier on" signal is transmitted by probe 30 and detected by testing unit 122, the output at the lock detect complement pin 6 of PLL 156 goes to a logical "high" state, thereby enabling transistor Q1 to conduct current from light emitting diode D2 to ground. The potential drop developed across the terminals of light emitting diode D2 when transistor Q1 begins to conduct causes diodes D2 to illuminate.

To indicate when a "probe status" signal has been transmitted by LEDs 50–54, the data output pin 7 of PLL 156 is connected to the base of transistor Q3 through resistor R14. The collector of Q3 is coupled to the base of transistor Q8 as well as to the 12 v bus through resistor R13. The emitter of transistor Q3 is connected to ground. In addition, the collector of transistor Q8 is connected to the 12 v bus and the emitter of transistor Q8 is connected to parallel circuit having a first branch containing resistor R29 and light emitting diode D3 in series, and a second branch having speaker BP1. Both these branches are connected to the collector of transistor Q1, while the emitter of transistor Q1 is wired to ground. When a "probe status" signal is received from the probe 30, the output at FSk data output pin 7 goes to a logical "low" state, causing transistor Q3 to go out of conduction, thus increasing the potential at the collector of transistor Q3. This increase in potential at the collector of transistor Q3 biases the base of transistor Q8 causing it to conduct current from the 12 v bus through both the light emitting diode D3 and speaker BP1. Because light emitting diode D3 and speaker BP1 are connected to the collector of transistor Q1, which is biased to allow conduction when a "carrier on" signal is received, the light emitting diode D3 illuminates and the speaker BP1 produces an audible signal.

To provide grounding for the FSK data output pin 7 when the "carrier on" signal is not received by PLL 156, a transistor Q2 is provided in which the collector is connected to FSK data output pin 7, the base is connected to the lock detect output pin 5, and the emitter is wired to ground. When a "carrier on" signal has not been received by PLL 156, the lock detect output pin 5 is at a logical "high" state causing transistor Q2 to conduct and connecting data output pin 7 to ground. Further, because lock detect complement pin 6 is at a logical "low" state when a "carrier on" signal has not been detected, transistor Q1 is brought out of conduction preventing light emitting diodes D2 and D3 from illuminating as well as preventing speaker BP1 from producing an audible signal.

By way of a non-limiting example, the dot/bar display driver is an LM 3914 available from National Semiconductor, and the PLL is an FSK Demodulator/Tone Decoder manufactured by Exar Integrated Systems, Inc. In addition, trigger tube 130 is a Mouser Part No. 36FR250, and the display is a General Instruments Part No. MV57164.

A method for using the testing unit 122 will now be described. To initiate testing of probe 30 located in a machine tool system, testing unit 122 is manually carried to the general proximity of the machine tool system. Switch 158 is selected to the appropriate channel so that LEDs 50–54 are able to communicate with testing unit 122. Switch 138 is closed so as to provide 18 v and 12 v potential to the circuits in testing unit 122.

Switch 126 is then activated to cause testing unit 122 to cause a flash to be emitted from flash tube 128. Probe 30 responds to this flash by generating an infrared signal which is received by diode D1. The signal received by diode D1 is then converted into a "carrier on" signal which indicates the operability of the probe. Stylus 56 is then moved to cause probe 30 to generate a "probe status" signal, which is also received by diode D1. The occurrence of a "probe status" signal is then displayed by diode D3 and by a audible signal generated by speaker BP1.

If a "carrier on" or "probe status" signal has not been received under the conditions described above, each battery 62 of probe 30 is removed and sequentially placed in receptacle 140. Male conectors 142 and 144 are then plugged into female connectors 146 and 148. Switch 150 is activated upon which the operability of battery 62 may be determined by viewing display 152. Batteries which indicate that they have been discharged are replaced. If probe 30 fails to properly test once all the discharged batteries have been replaced, thus indicating the circuitry of probe 30 is faulty, probe 30 is replaced with a properly functioning probe. Once probe 30 is properly operating, testing unit 122 is manually carried to another machine tool system to test its probe 30. The method described above is then repeated.

It should be understood that while the present invention was described in connection with one specific embodiment, other modifications will become apparent to one skilled in the art upon a study of the specification, drawings and following claims.

I claim:

1. An apparatus for testing the operability of a probe for detecting contact with an object having a displaceable stylus, said probe being used in a machine tool system having a controller, said apparatus comprising:
   first circuit means for generating a first signal, said first circuit means able to generate said first signal independently of said controller, said first signal inducing said probe to generate a second signal; and
   second circuit means for receiving said second signal, said second circuit means being adapted to generate a third signal indicative of the operability of said probe when said second signal is received, said third signal comprising first and second indicator signals, said first indicator signal being generated when said second signal has a first characteristic, said second indicator signal being generated when said second signal has a second characteristic produced in response to the displacement of said stylus.

2. The apparatus of claim 1 wherein said apparatus is contained in a housing of sufficiently small dimension to be hand held.

3. The apparatus of claim 1 wherein said apparatus includes a manually activated device for energizing said first circuit means.

4. The apparatus of claim 1 wherein said first circuit means is adapted to generate a first optical signal, said probe being adapted to respond to said first signal by generating a second optical signal having a given characteristic, and wherein said third signal is adapted to energize a visual indicating device thereby providing the user with an indication that the probe is capable of proper operation.

5. The apparatus of claim 4 wherein the optical signal generated by the first circuit means is a flash of infrared radiation.

6. The apparatus of claim 5 wherein said probe is powered by at least one self-contained battery, said apparatus further includes:
   a receptacle for receiving at least one of said batteries;
   third circuit means for detecting the operability of said battery; and
   means for electrically connecting said receptacle to said third circuit means whereby the operability of said battery may be determined by said third circuit means.

7. An apparatus in the form of a hand-held housing for testing the operability of a probe having a displaceable stylus used for detecting contact with a workpiece, said probe being used in a machine tool system having a controller, said probe including a self-contained battery source of electrical potential, said apparatus comprising:
   first circuit means for generating a first signal, said first signal inducing said probe to generate a second signal, said first circuit means able to generate said first signal independently of said controller;
   second circuit means for receiving said second signal, said second circuit means being adapted to generate a third signal indicative of the operability of said probe when said second signal is received, said third signal comprising first and second indicator signals, said first indicator signal being generated when said second signal has a first characteristic, said second indicator signal being generated when said second signal has a second characteristic produced in response to displacement of said stylus; and
   third circuit means for determining the operability of said battery source.

8. The apparatus of claim 7 wherein the housing includes a manually activated device for energizing said first circuit means.

9. The apparatus of claim 7 wherein the first signal is a first optical signal, and wherein said third signal is adapted to energize a visual indicating device on said housing thereby providing the user with an indication that the probe is capable of proper operation.

10. The apparatus of claim 9 wherein the optical signal generated by said first circuit means is a flash of infrared radiation.

11. The apparatus of claim 7 wherein said second circuit means includes a phase locked loop circuit means for decoding said second signal into first and second indicator signals, said first indicator signal being generated upon receipt of a signal from the probe having the first characteristic, said second indicator signal indicating whether said stylus has been displaced and being generated upon receipt of a signal from the probe having the second characteristic, the second characteristic being different than the first characteristic.

12. The apparatus of claim 11 wherein said phase-locked loop circuit means has a lock detect complement output which has a given logical output state when said phase-locked loop circuit means is locked, said lock detect complement output indicating the existence of said first indicator signal.

13. The apparatus of claim 11 wherein the first indicator signal is connected to a first visual indicating device of the housing, and wherein the second indicator signal is connected to a second visual indicating device and an audible device in the housing.

14. A method for testing the operability of a battery-operated probe having a displaceable stylus located in a machine tool system and used to transmit signals in connection with inspection of a workpiece, said probe being used in a machine tool system having a controller, said method comprising:

manually carrying a hand-held testing unit into the general proximity of said machine tool system;

activating a device on the said testing unit to cause said testing unit to transmit a first signal to said probe, with the probe responding to said first signal by transmitting a second signal when said probe is in condition for proper operation, said testing unit transmitting said first signal independently of said controller;

receiving said second signal by said testing unit; and generating a perceivable signal by said testing unit in response to the receipt of said second signal thereby providing an indication of the operability of said probe, said perceivable signal being operable to indicate whether said second signal has a first characteristic, said perceivable signal being further operable to indicate whether said second signal has a second characteristic generated upon displacement of said stylus.

15. The method of claim 14 wherein said first and second signals comprise infrared radiation having given characteristics.

16. The method of claim 14 further including the step of decoding said second signal into a first and second indicator signals, said first indicator signal being generated upon receipt of the second signal from said probe when said second signal has the first characteristic, said second indicator signal indicating whether the stylus of said probe has been displaced to such an extent that it then is in contact with said workpiece and being generated upon receipt of the second signal from said probe when said second signal has the second characteristic, said second characteristic being different from the first characteristic.

17. The method of claim 14 wherein said testing unit is manually activated to cause said testing unit to transmit said first test signal.

18. The method of claim 14 further comprising the steps of:

removing said battery from said probe; and inserting said battery into a receptacle electrically communicating with said testing unit so that the operability of said battery may be determined.

19. Apparatus for testing the operability of a probe used in detecting contact with a workpiece, said probe being used in a machine tool system having a controller, said probe having a self-contained battery source of electrical potential, said apparatus comprising a hand-held testing unit having a housing including:

means for generating and transmitting an infrared signal to said probe independently of said controller, said means including an oscillating circuit and a transformer electrically coupled therewith, said oscillating circuit being adapted to selectively induce current across the secondary winding of said transformer, said means for generating further including an infrared flash tube connected to said secondary winding of said transformer and being adapted to generate a flash of infrared radiation when said oscillating circuit induces said current across said secondary winding;

means for receiving an infrared signal from said probe and generating an electrical signal indicative of the operability of said probe;

means for filtering and amplifying said electrical signal;

phase-locked loop means for decoding said electrical signal and generating a carrier on signal and a probe status signal;

first indicator means responsive to said carrier on signal for indicating the presence thereof;

second indicator means responsive to said probe status signal for indicating the presence thereof;

a receptacle for receiving said battery source; and circuit means for determining the operability of said battery source.

20. The apparatus of claim 19 which further includes a plurality of capacitor means of different values for determining the center frequency of said phase-locked loop means, and switch means for coupling one of said capacitor means to the phase-locked loop means thereby allowing said phase-locked loop means to determine the operability of a plurality of probes transmitting infrared signals at different frequencies.

21. The apparatus of claim 19 wherein said means for generating further includes a voltage doubler circuit electrically communicating with the secondary winding of said transformer.

* * * * *